United States Patent Office 3,231,524
Patented Jan. 25, 1966

3,231,524
METHOD OF FOAMING AND EXTRUDING A BLEND OF POLYMERS AND FOAMED ARTICLE OBTAINED THEREFROM
Donald W. Simpson, Auburn, Mich., assignor to The Dow Chemical Company, Midland, Mich., a corporation of Delaware
No Drawing. Filed Apr. 16, 1962, Ser. No. 187,966
13 Claims. (Cl. 260—2.5)

This invention relates to the preparation of plastic foam. It more particularly relates to the extrusion of a foam plastic sheet.

For purposes such as packaging, overwrapping, thin insulating sheets and the like, it is frequently desirable to utilize thin sheets of foamed or cellular plastic. Such sheets often are desired to be opaque or semiopaque or have a minimum light transmission in order to properly cover and hide from view the packaged material. This can be readily done by employing a sheet of adequate thickness to prevent sufficient light transmission from one side to the other to clearly show the article. However, the packaging of articles is a highly competitive business, and in order to successfully and economically provide such a package for mass distribution the cost of the wrapping material must be as low as possible. Such a condition requires that the overwrap material be thin, light in weight, give the sensation of a sponge or foam material and yet not be sufficiently thin that it is substantially transparent. In the preparation of plastic foams often there are utilized water-soluble compositions for the generation of gas to form the cellular structure. Hydrophyllic systems of this nature oftentimes are undesirable, particularly where the product is utilized for electrical insulating purposes. Frequently organic insoluble and abrasive materials are employed to control cell size. Such abrasive materials are generally undesirable in plastic compositions employed in plastics processing machinery because of the wear and abrasion of the operating surfaces caused thereby. Such materials are particularly undesirable where extrusion of foamed tubular plastics is accomplished, as the die clearances must be maintained to particularly close dimensional tolerances and wear thereof is undesirable. Further, conventional cell size controlling agents usually do not produce a thin extruded sheet of sufficient opacity for many packaging applications.

It is therefore an object of this invention to provide a method of preparing a thin thermoplastic foamed sheet which is opaque or semiopaque without utilizing inorganic cell size control agents.

It is a further object of this invention to provide a method of preparing a thin thermoplastic foamed sheet in which all constituents are soluble in an organic solvent.

It is a further object of this invention to provide a thin thermoplastic foamed sheet having a relatively small cell size.

It is a further object of this invention to provide a thermoplastic resinous foamed sheet which is oriented or stretched after extrusion.

Another object of this invention is to provide a thin, thermoplastic foamed sheet having low light transmission characteristics prepared from extrusion grade resins.

These benefits and other advantages in accordance with the invention are achieved in the preparation of a cellular plastic article by extruding a foamable thermoplastic polymer composition admixed with a minor portion of a copolymer of an organic acid or a salt thereof selected from the group consisting of maleic acid, citraconic acid, itaconic acid, methacrylic acid, acrylic acid, their anhydrides and ammonium salts, and an alkenyl aromatic monomer of the benzene series containing up to about 10 carbon atoms and having the alkenyl group attached directly to the benzene ring, having the formula Ar—CR=CH$_2$ wherein R is methyl or hydrogen, through an orifice into a zone of sufficiently lower pressure to permit the expansion of the extrude and the formation of a plurality of fine cells within.

Also contemplated within the scope of the present invention is an oriented extruded foamed plastic sheet comprised of a foamed plastic material containing intimately incorporated therewith a minor proportion of a copolymer of from about 10 to 50 parts of a copolymerized organic acid material selected from the group consisting of maleic acid, citraconic acid, methacrylic acid, acrylic acid, itaconic acid, their anhydrides and ammonium salts, and from about 90–50 percent of an alkenyl aromatic monomer of the benzene series having the formula Ar—CR=CH$_2$ wherein R is a methyl or hydrogen, containing up to 10 carbon atoms and having the alkenyl group attached directly to the benzene ring.

The process can be employed for making cellular articles from polystyrene, polyvinyl chloride, copolymers of vinylidene and vinyl chloride, polyacrylic esters, polymethacrylic esters, copolymers of styrene and methyl methacrylate, resinous polyolefins such as polyethylene, polypropylene, ethylene-propylene copolymers, copolymers of styrene and acrylonitrile or polymers of styrene containing natural or a synthetic rubber and mixtures and blends thereof.

The method is advantageously employed for making cellular articles from alkenyl aromatic resins such as the thermoplastic resinous polymers and copolymers of one or more monovinyl aromatic compounds of the benzene series wherein the polymeric resin comprises in chemically combined form at least 70 percent by weight of at least one monovinyl aromatic compound having the general formula Ar—CR=CH$_2$ wherein Ar represents an aromatic hydrocarbon radical or an aromatic halohydrocarbon radical of the benzene series. Examples of such alkenyl aromatic resins are the solid homopolymers of styrene, vinyltoluene, vinylxylene, ar-ethylvinylbenzene, isopropylstyrene, tert.-butystyrene, ar-chlorostyrene, ar-dichlorostyrene, ar-fluorostyrene, ar-bromostyrene; the solid copolymers of two or more of such monovinyl aromatic compounds and said copolymers of one or more of such monovinyl aromatic compounds and minor amounts, e.g. from 1 to 30 percent by weight, of other readily copolymerizable olefinic compounds such as acrylonitrile, methyl methacrylate or ethyl acrylate.

Volatile blowing agents for foaming the compositions are well known in the art.

Suitable volatile organic fluids are saturated aliphatic hydrocarbons containing from 3 to 7 carbon atoms in the molecule such as propane, butane, pentane, hexane, heptane, cyclohexane and perchlorofluorocarbons such as dichlorodifluoromethane, trichlorofluoromethane, monochlorotrifluoromethane, tetrachlorodifluoroethane, dichlorotetrafluoroethane or monochloropentafluoroethane, which fluid agent has a molecular weight of at least 58 and a boiling point below 95° centigrade or lower at atmospheric pressure. The fluid foaming agent is usually employed in amount corresponding to from about 0.03 to about .5 gram molecular proportion per 100 grams of polymer. Mixture of such volatile organic fluids are also utilized to advantage in the practice of the invention.

The unsaturated carboxylic acid-monovinyl aromatic copolymers are useful when they contain from about 10 percent to about 50 percent of the unsaturated carboxylic acid component together with 90–50 percent of a monovinyl aromatic monomer. Typical of the carboxylic acid monomers which are utilized in the practice of the invention are such materials as maleic acid, citraconic acid, acrylic acid, methacrylic acid, and the like, as well as their anhydrides and ammonium salts e.g. maleic anhydride, ammonium maleate, and ammonium acrylate. Typical of the monovinyl aromatic monomers of the benzene series which are used to prepare copolymers of the present invention are such monomers as styrene, ortho-, meta-, and para-vinyl toluenes, ortho-, meta-, and para-ethyl styrene, 2,4-diethyl styrene, isopropyl styrene, and the like. Such copolymers are readily prepared by techniques well known in the art utilizing free radical polymerization techniques in mass, suspension or emulsion. Beneficially such copolymers are readily prepared by utilizing the recirculating coil polymerizing technique. The carboxylic acid-monovinyl aromatic copolymer can be used in amounts of from about 0.1 to 10, preferably from 0.3 to 5. percent by weight of the polymeric ingredients.

The three essential components of the extrudable composition, the polymer, the acid copolymer and the blowing agent, are readily combined in a variety of ways. The polymer comprising the major portion of the composition may be impregnated with the blowing agent and subsequently admixed with the acid copolymer. Beneficially the polymer and acid copolymer may be admixed and the blowing agent added during the extrusion. Dry blending of granular polymer and acid copolymer prior to extrusion may be utilized to assure a uniform feed stock or properly proportioned streams of the components may be fed to a mixing extruder.

Extrusion conditions useful in the practice of the present invention are somewhat dissimilar to those utilized in the extrusion of conventional or solid polystyrene. The temperature of the cylinder or heating zone is usually maintained in a range of from about 145 to 250° centigrade. The temperature of the gel is maintained in the temperature range of about 135 to 175° centigrade prior to issuing from the orifice. In the extrusion of the compositions utilized in the practice of the present invention it is essential that the temperature of the heat plastified gel prior to extrusion reach a temperature of about at least 143° centigrade. If the compositions are extruded without reaching this temperature, there is a tendency for coarse, large bubbles to appear in the material and consequently the light transmission of the resultant extruded body is considerably greater than that of extruded bodies prepared by raising the gel temperature above 143° centigrade.

It is often advantageous to add the blowing agent or volatile organic liquid to the heat-plastified or molten polymeric mass within the extruder rather than utilizing a plastic material which has been previously impregnated with a volatile liquid to act as a blowing agent. The direct addition of the blowing agent to the extruder results in a readily controlled quantity of blowing agent and permits a more uniform product to be obtained as well as a reduction in the number of steps in the preparation of the feed material.

Usually in the preparation of the thin sheets of the invention it is beneficial to extrude the foamable polymeric mass in the form of a thin tube and subsequently expand the tube by the application of internal fluid pressure thereto to result in a product comprising a plastic matrix having disposed therein a large number of small cavities of a generally plate-like nature. Such flattened cavities, particularly when present in a large number, provide a plurality of reflecting surfaces which serve to render the resultant product opaque or semiopaque although the extruded mass, in a fully compacted form, is transparent. Such plate-like cells are readily formed when a sheet or tube is extruded, foamed, and subsequently stretched to from 100 to 200 percent of its originally extruded dimension. Usually it is advantageous to stretch such a sheet or tube uniformly in all directions. This is most readily accomplished during the extrusion of foam plastic tubes by the application of internal pressure and simultaneous drawing of the material away from the point of extrusion.

The invention is illustrated but not limited by the following examples.

EXAMPLE I

A 2½ inch National Rubber Machinery extruder is fitted with a blowing agent inlet positioned about 25 inches from the terminal portion of the screw. The blowing agent inlet is in communication with a metering pump. Following the mixing section of the extruder is a cooling section which is fitted with a film die having an annular orifice about 1½ inches in diameter and an opening about 0.20 inch wide. A pair of nip rolls are positioned about 4 feet from the extrusion die and means is provided through the tubular die to apply internal gas pressure. A blend is made utilizing 100 parts by weight of polystyrene, 3 parts of a copolymer of 32½ percent maleic anhydride and 67½ percent styrene. Material is extruded as a tube at a rate of about 30 pounds per hour of the mixture. The temperature within the heating section of the extruder is about 155° centigrade and the die temperature is 143° centigrade. When a steady state operating condition is reached, normal pentane is pumped into the side port of the extruder at a rate corresponding to 5.8 pounds of pentane for each hundred pounds of polystyrene. The extruded tube is passed through the nip rolls. Nitrogen gas is forced into the extruded tube to give a bubble of about 12 inches in diameter. The resultant blown foam tube is flattened and the edges trimmed to result in two sheets of the foamed film having a thickness of about 12 mils. The resultant film is semiopaque and shows a relatively high optical density for its thickness when compared with foamed polystyrene film prepared using known nucleating agents. Similar results are obtained when 0.1 part of an oil-soluble red dye per 100 parts of polystyrene is incorporated into the extruder feed stock.

EXAMPLE II

The procedure of Example I is repeated with the exception that 10 parts of a styrene-acrylic acid copolymer per hundred parts of polystyrene are employed instead of the styrene maleic anhydride copolymer and 5.5 parts of normal pentane are used rather than 5.8 parts. The styrene acrylic acid copolymer contains about 10 percent acrylic acid and about 90 percent styrene copolymerized therein. The resultant film has properties substantially commensurate with those of the film prepared in Example I.

EXAMPLE III

The procedure of Example II is followed with the exception that 1.5 parts of ammoniated styrene-maleic anhydride copolymer are utilized instead of the maleic anhydride copolymer. The ammoniated styrene-maleic anhydride copolymer utilized is obtained by treating the copolymer of Example I with substantially anhydrous ammonia under a pressure of about 2 pounds per square inch gauge for a period of 24 hours at a temperature of about 25° centigrade. The properties of the film obtained are substantially similar to those obtained in Example II.

EXAMPLE IV

The procedure of Example I is followed with the exception that 1.5 parts of the styrene-maleic anhydride copolymer are used and 5.5 parts of a blowing agent are used. The blowing agent comprises a mixture of 10 percent by weight of dichlorodifluoromethane and 90 percent normal pentane. The resultant film has a light transmittance of about 27 percent at a wave length of 550 millimicrons and a thickness of 18 mils.

EXAMPLE V

Following the procedure substantially as outlined in Example I, a plurality of foamed compositions are prepared wherein the amount of the copolymeric additive is based on maintaining a total level of 0.25 part of copolymerized maleic anhydride to 100 parts of styrene. Foamed film is prepared and the transmittance of light having a wave length of 550 millimicrons is determined. The results are set forth in the following table.

*Table*

S/MA[1] COMPOSITIONS

| Wt. Percent MA in S/MA | Light Transmittance at 550 millimicrons, percent | Film Thickness, Mils |
| --- | --- | --- |
| 19.83 | 65.4 | 9 |
| 23.50 | 63.1 | 10 |
| 29.83 | 54.4 | 8 |
| 31.70 | 52.0 | 9 |
| 32.80 | 53.2 | 11 |
| 34.53 | 55.2 | 10 |
| 41.50 | 64.3 | 12 |
| 42.90 | 57.9 | 8 |
| 48.50 | 69.7 | 9 |

[1] S=styrene. MA=maleic anhydride.

EXAMPLE VI

The procedure of Example I is followed with the exception that 1½ parts of a styrene-citraconic acid copolymer and 5.5 parts of the blowing agent are used. The citraconic acid copolymer consists of 10 parts of citraconic acid copolymerized with 90 parts of styrene. Results commensurate to those of Example I are obtained.

EXAMPLE VII

The procedure of Example VI is followed with the exception that 1.5 parts of a styrene-acrylic acid copolymer are utilized as the nucleating agent. The styrene-acrylic acid copolymer comprises 10 parts of acrylic acid copolymerized with 90 parts of styrene. The resultant foam film has properties commensurate with those of the film obtained in Example I.

EXAMPLE VIII

The procedure of Example VII is followed with the exception that 1.5 parts of a styrene-methacrylic acid copolymer are employed as a nucleating agent. The nucleating copolymer comprises 10 parts of methacrylic acid copolymerized with 90 parts of styrene. The resultant film is found to be fine celled, semiopaque, and to have a pleasing hand.

EXAMPLE IX

The procedure of Example VIII is followed with the exception that 1.5 parts of a styrene-itaconic acid copolymer which are employed as a nucleating agent. The nucleating copolymer comprises 22 parts of itaconic acid copolymerized with 78 parts styrene. The resultant film is fine celled and semiopaque.

In a manner similar to the foregoing examples, other thin foam film products are readily prepared from polyvinyl chloride, sarans, styrene-ethyl acrylate copolymers, styrene-methyl methacrylate copolymers, and styrene-acrylonitrile copolymers such as are prepared from 70 parts styrene and 30 parts acrylonitrile, blends of styrene and polyethylene such as 80 parts of polystyrene and 20 parts of polyethylene, blends of polyvinyl chloride with styrene-acrylonitrile polymers and the like when suitable nucleating copolymers are included therein.

As is apparent from the foregoing specification, the method and manufacture of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. In a process for the extrusion of a cellular plastic article comprising extruding a synthetic thermoplastic resinous composition selected from the group consisting of thermoplastic resinous polymers of monovinyl aromatic compounds of the benzene series wherein the polymeric resins comprises in chemically combined form at least 70 weight percent of at least one monovinyl aromatic compound of the formula Ar—CH=CH$_2$ wherein Ar is selected from the group consisting of aromatic hydrocarbon radicals of the benzene series and aromatic halohydrocarbon of the benzene series with up to 30 weight percent of another readily copolymerizable olefinic compound which includes a volatile foaming agent, heating said plastic composition to a temperature sufficient to cause foaming and extruding said composition through an orifice into a region of lower pressure to permit the formation of a plurality of fine cells within the extruded body, the improvement which comprises including a minor proportion of a copolymer of from about 10 to 50 percent of a copolymerizable organic acid material selected from the group consisting of maleic acid, citraconic acid, itaconic acid, methacrylic acid, acrylic acid, their anhydrides and ammonium salts, and from about 90–50 percent of an alkenyl aromatic monomer of the benzene series containing up to about 10 carbon atoms and having the alkenyl group attached directly to the benzene ring.

2. The process of claim 1, wherein the foamable plastic composition is extruded as a tube and subsequently oriented by internal gas pressure.

3. The process of claim 1, including the step of adding a blowing agent to the thermoplastic resinous composition during the extrusion thereof.

4. The process of claim 3, wherein the step of extrusion is accomplished in a screw extruder and the blowing agent is added to the extruded composition at approximately midway between the ends of the screw.

5. The process of claim 1, wherein said organic acid material is maleic anhydride.

6. The process of claim 1, wherein said copolymer comprises about 20–40 percent of a copolymerizable organic acid.

7. The process of claim 1, wherein said thermoplastic resinous composition comprises polystyrene.

8. The process of claim 1, wherein said copolymer is a copolymer of 25–35 percent maleic anhydride and 75–65 percent styrene.

9. A cellular plastic article comprising a thin thermoplastic resinous oriented foamed sheet wherein the sheet contains a major portion of a polymer and selected from the group consisting of thermoplastic resinous polymers of monovinyl aromatic compound of the benzene series wherein the polymeric resins comprises in chemically combined form at least 70 weight percent of at least one monovinyl aromatic compound of the formula

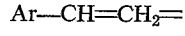

Ar—CH=CH$_2$= wherein Ar is selected from the group consisting of aromatic hydrocarbon radicals of the benzene series and aromatic halohydrocarbon of the benzene series with up to 30 weight percent of another readily copolymerizable olefinic compound containing a minor proportion of a copolymer of from about 10 to 50 parts of a copolymerizable organic acid material selected from the group consisting of maleic acid, citraconic acid, itaconic acid, methacrylic acid, acrylic acid, their anhydrides and ammonium salts and from about 90 to 50 percent of an alkenyl aromatic monomer of the benzene series having the formula Ar—CR=CH$_2$ wherein R is selected from the group consisting of methyl and hydrogen, containing up to 10 carbon atoms and having the alkenyl group attached directly to the benzene ring.

10. The sheet of claim 9, wherein said organic acid material is maleic anhydride.

11. The sheet of claim 9, wherein said copolymer comprises about 20–40 percent of a copolymerizable organic acid.

12. The article of claim 9, wherein said thermoplastic resinous composition comprises polystyrene.

13. The article of claim 9, wherein said copolymer is a copolymer of 25–35 percent maleic anhydride and 75–65 percent styrene.

References Cited by the Examiner
UNITED STATES PATENTS

| Re. 23,514 | 6/1952 | Voss et al. | 260—78.5 |
| 2,333,513 | 11/1943 | Berberich | 260—874 |
| 2,857,625 | 10/1958 | Carlson | 260—2.5 |

OTHER REFERENCES

SPE Journal, Collins, July, 1960 vol. 16, No. 7, pp. 705–709.

MURRAY TILLMAN, *Primary Examiner.*

LEON BERCOVITZ, *Examiner.*